Figure 5:
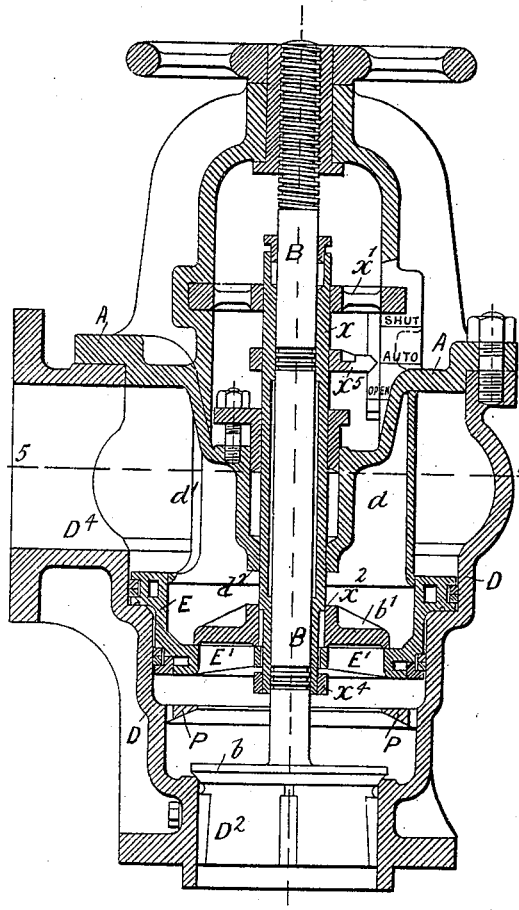

No. 619,589. Patented Feb. 14, 1899.
A. T. MACFARLANE & G. W. BRYANT.
VALVE.
(Application filed Dec. 14, 1897.)
(No Model.) 5 Sheets—Sheet 1.
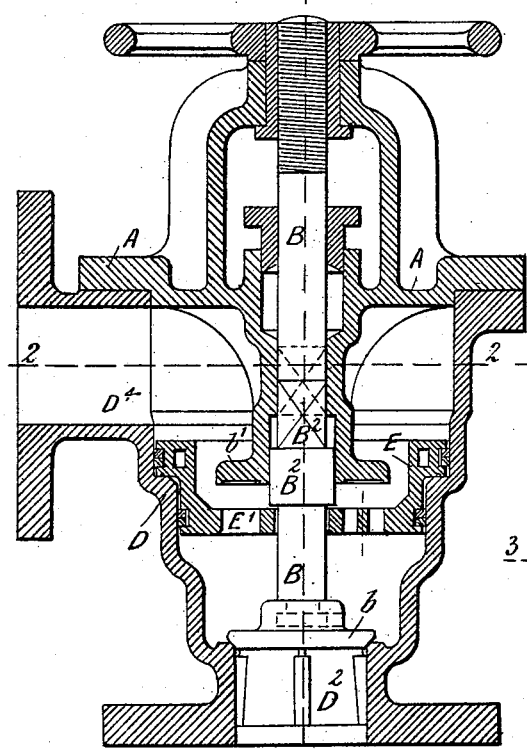
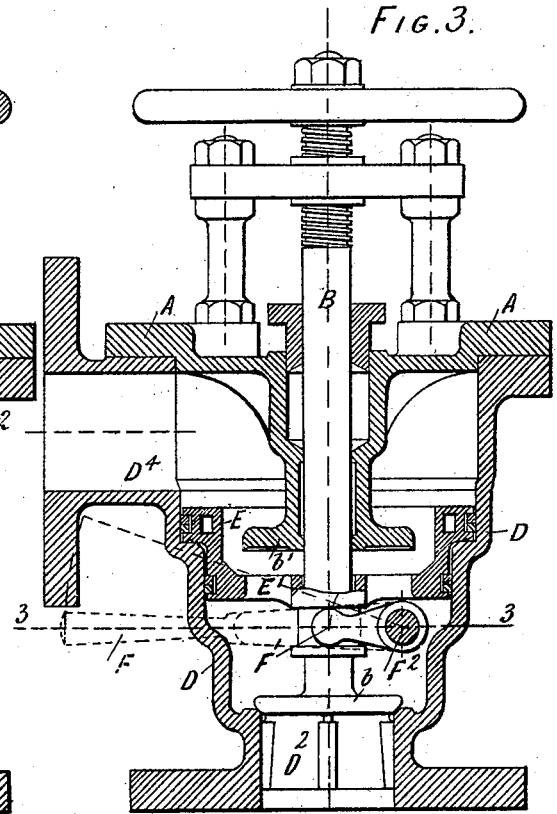
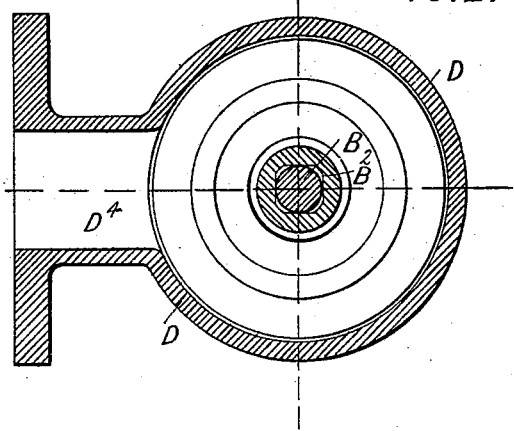
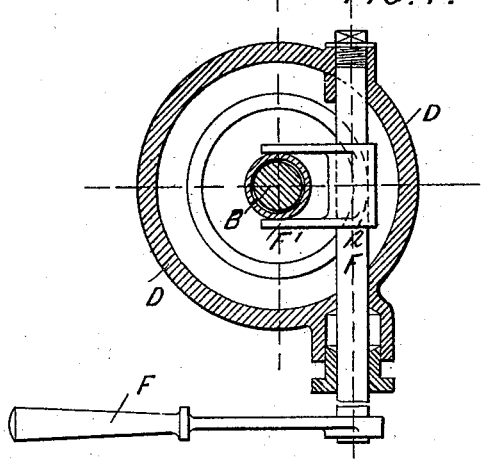
Witnesses:
F. W. Wright
S. C. Connor
Inventors
A. T. Macfarlane & G. W. Bryant
By Howson and Howson
Their Attorneys.

No. 619,589. Patented Feb. 14, 1899.
A. T. MACFARLANE & G. W. BRYANT.
VALVE.
(Application filed Dec. 14, 1897.)
(No Model.) 5 Sheets—Sheet 2.

WITNESSES:
F. W. Wright.
A. C. Connor.

INVENTORS
A. T. MACFARLANE & G. W. BRYANT
BY Howson and Howson
THEIR ATTORNEYS.

THE NORRIS PETERS CO., PHOTO-LITHO., WASHINGTON, D. C.

No. 619,589. Patented Feb. 14, 1899.
A. T. MACFARLANE & G. W. BRYANT.
VALVE.
(Application filed Dec. 14, 1897.)
(No Model.) 5 Sheets—Sheet 3.
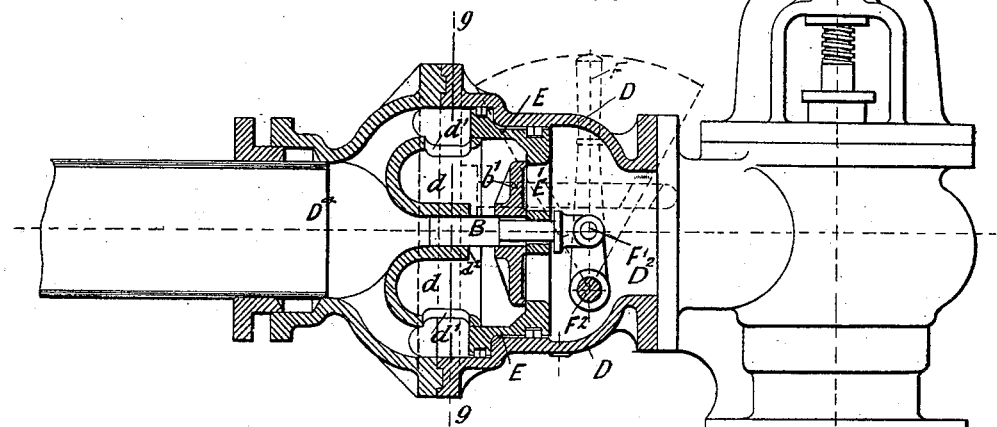
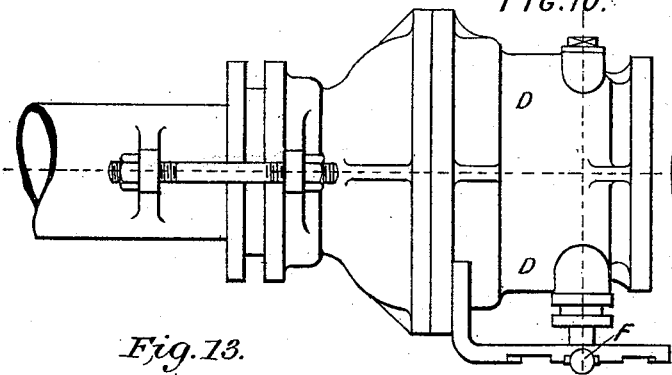
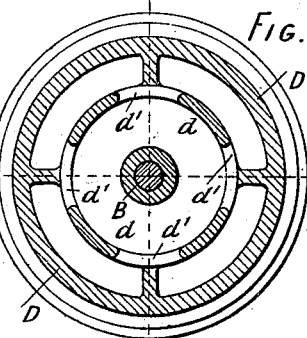
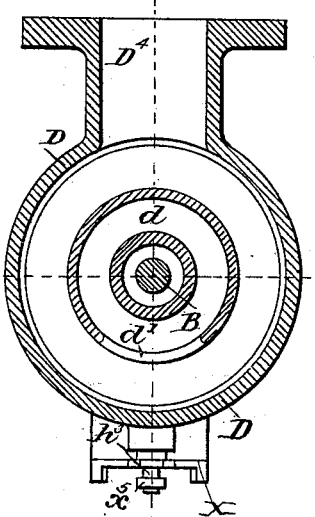
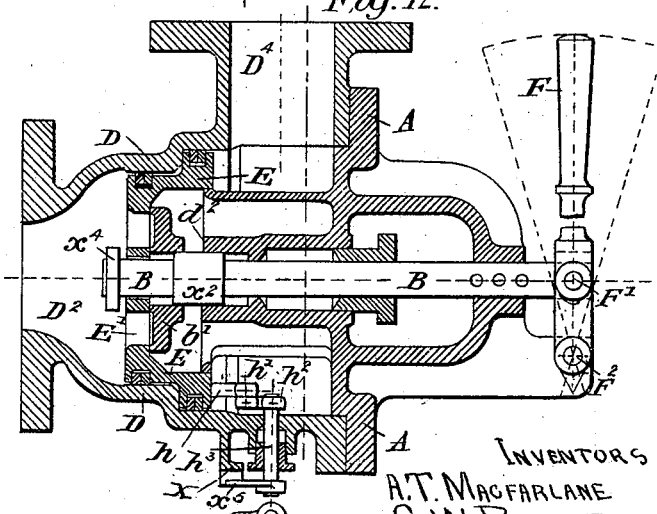
INVENTORS
A. T. MACFARLANE
G. W. BRYANT
BY Howson and Howson
THEIR ATTORNEYS
WITNESSES:
J. W. Wright
A. C. Connor No. 619,589. Patented Feb. 14, 1899.
A. T. MACFARLANE & G. W. BRYANT.
VALVE.
(Application filed Dec. 14, 1897.)
(No Model.) 5 Sheets—Sheet 4.
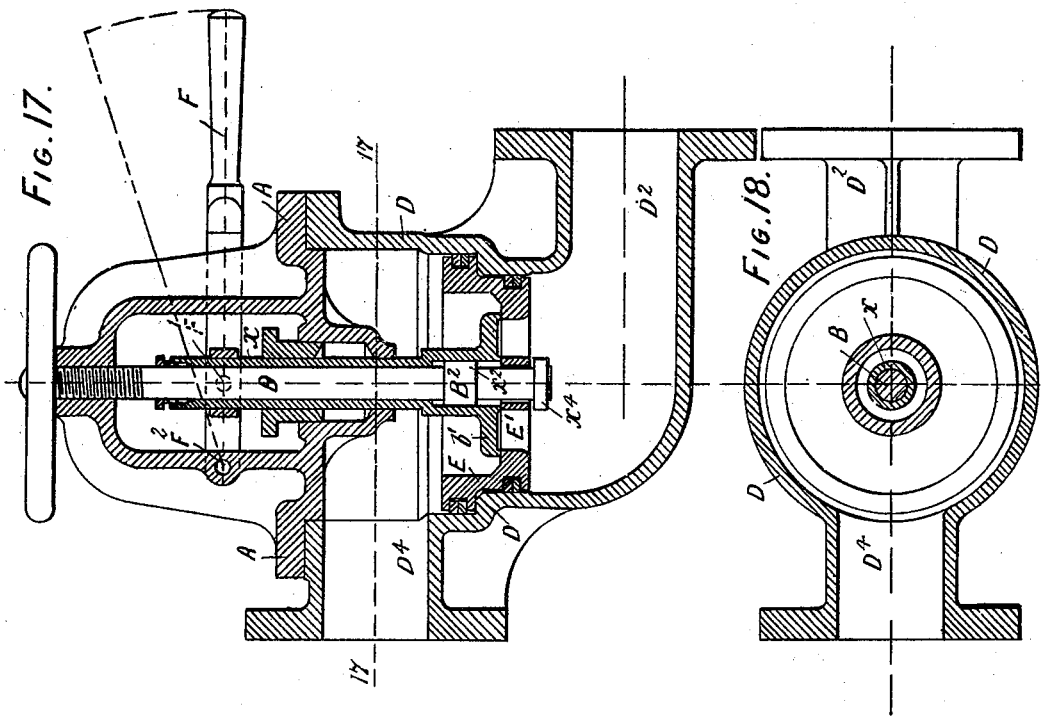
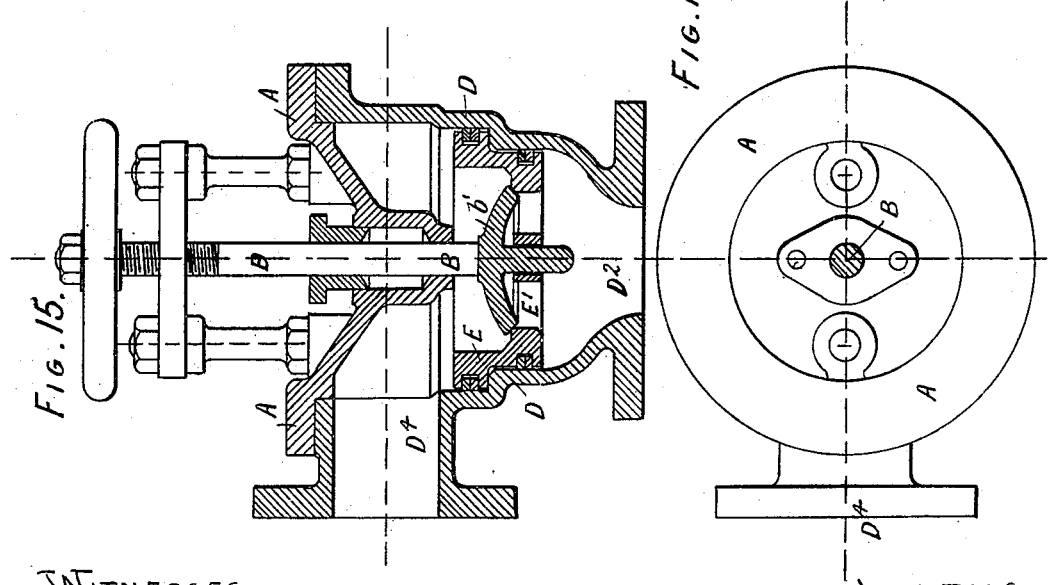

No. 619,589. Patented Feb. 14, 1899.
A. T. MACFARLANE & G. W. BRYANT.
VALVE.
(Application filed Dec. 14, 1897.)
(No Model.) 5 Sheets—Sheet 5.
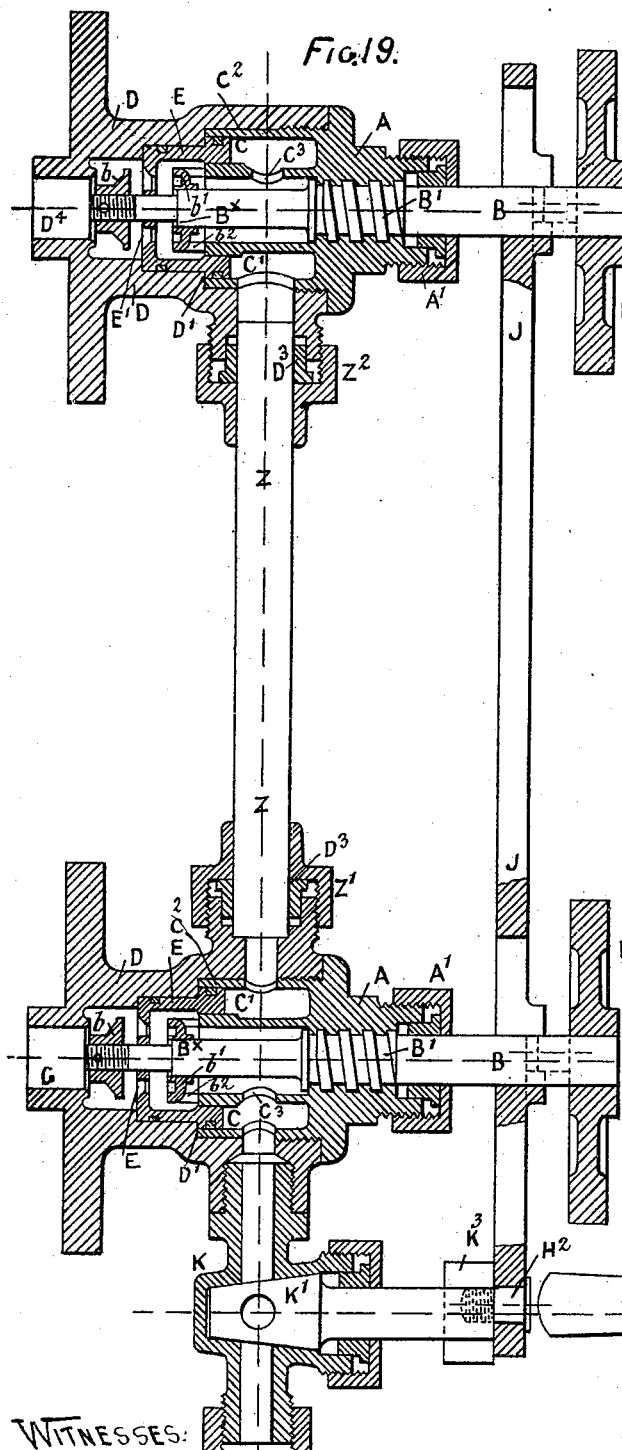
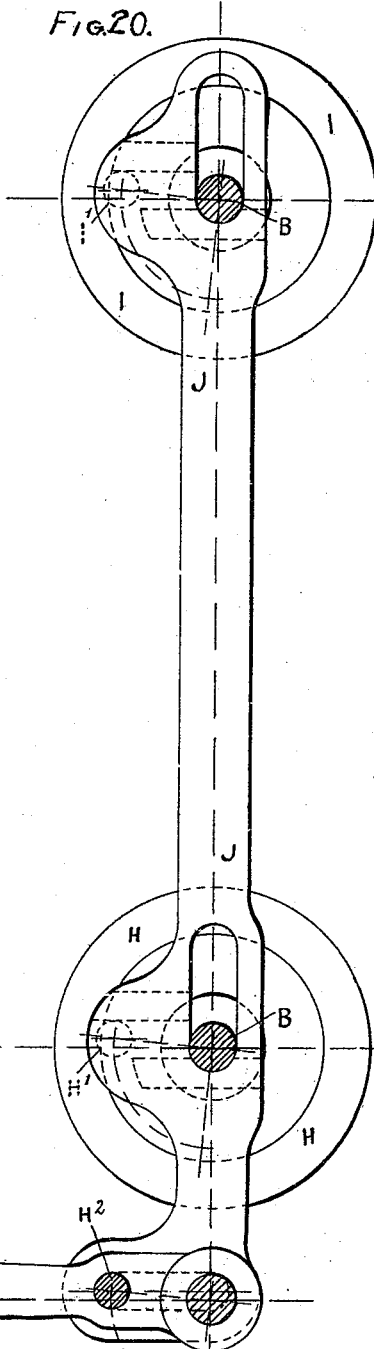
WITNESSES:
F. W. Wright
S. C. Connor
INVENTORS
A. T. Macfarlane & G. W. Bryant
BY Howson and Howson
THEIR ATTORNEYS

UNITED STATES PATENT OFFICE.

ALEXANDER THOMSON MACFARLANE, OF GLASGOW, SCOTLAND, AND GEORGE WALLACE BRYANT, OF GRAVESEND, ENGLAND.

VALVE.

SPECIFICATION forming part of Letters Patent No. 619,589, dated February 14, 1899.

Application filed December 14, 1897. Serial No. 661,892. (No model.)

*To all whom it may concern:*

Be it known that we, ALEXANDER THOMSON MACFARLANE, a resident of Glasgow, Scotland, and GEORGE WALLACE BRYANT, a resident of Gravesend, Kent county, England, subjects of the Queen of Great Britain and Ireland, have invented certain new and useful Improvements in Valves, (for which patents have been obtained in Great Britain, No. 4,823, dated March 7, 1895, and No. 9,306, dated May 2, 1896; in France, No. 254,440, dated March 3, 1896, and in Germany, No. 89,549, dated March 3, 1896,) of which the following is a specification.

The object of our invention is to provide a valve specially suitable where steam or fluid pressure bursts are liable to take place, and this is accomplished my means of a movable annular piston or diaphragm arranged so that in the ordinary or normal working condition the pressure in the steam or fluid holds the piston or diaphragm in equilibrium; but on a burst taking place or, in case of war vessels in action, a shot striking a pipe the pressure is released and the supply shut off instantly and automatically.

Referring to the drawings which form a part of this specification, Figure 1 is a sectional elevation showing our improvements as applied to a stop-valve. Fig. 2 is a horizontal section as taken on the line 2 2, Fig. 1. Fig. 3 is a sectional elevation of a slightly-modified form of valve from that shown on Fig. 1. Fig. 4 is a section on the line 3 3, Fig. 3. Figs. 5, 6, 7, and 8 are views, corresponding to Figs. 1, 2, 3, and 4, of slightly-modified arrangements of our improvements, Fig. 6 being a section as taken on the line 5 5, Fig. 5, and Fig. 8 a section on line 7 7, Fig. 7. Figs. 9, 10, and 11 are views of another modified arrangement of our improvements, Fig. 9 being a sectional elevation of our improved valve, Fig. 10 an outside view, and Fig. 11 a section on the line 9 9, Fig. 9. Figs. 12 and 13 are vertical and horizontal sections of a slightly-modified construction of valve and its fittings from that shown in Figs. 9 to 11, and Fig. 14 is an end view showing the indicating-pointer. Figs. 15 to 18 are vertical and horizontal sections of other modified arrangements of our improved valves, Fig. 15 being a sectional elevation and Fig. 16 a plan view of Fig. 15. Fig. 17 is a sectional elevation; and Fig. 18 a section on the line 17 17, Fig. 17. Fig. 19 is a sectional elevation; and Fig. 20 a view at right angles taken through spindles thereto, showing our improvements as applied to water-gages.

Referring to Figs. 1 and 2 of the drawings, the valve E is packed like a piston, while its center part E' is in the form of an annular piston-valve having differential area exposed to the fluid-pressure, the greater area being on that side of the valve away from the direction of fluid-pressure, and is formed with a series of segmental openings. This piston E is mounted loose on the spindle B, and a valve $b$ is fitted on lower end of spindle to work over an inlet branch $D^2$ on the chest D.

The spindle B, as shown, is formed with a square part $B^2$, so that it will not turn when raising or lowering the valve $b$. The disk or abutment valve $b'$ is formed on the end of the stuffing-box.

The action of the valve is as follows: When the valve $b$ is raised from its seat $D^2$, steam or other fluid passes in by the branch $D^2$ and passes through the segmental ports E' of valve E. The steam or other fluid exerts its pressure on the upper and lower surfaces of piston E and passes into the outlet branch $D^4$. In its normal condition the float-valve E remains in the position shown in the drawings; but should a burst or escape take place the pressure is released and this valve or abutment E will be automatically raised until it comes against the disk $b'$, and so the supply will be shut off.

In the arrangement shown in Figs. 3 and 4 the boss of piston E is shown as connected with an actuating hand-lever F. This arrangement can be used as a throttle-valve, and should the cylinder burst or cover blow off the pressure would be released and the piston E act in the manner hereinbefore described. The actuating of the lever F will insure the automatic valve being in working order.

Figure 6:
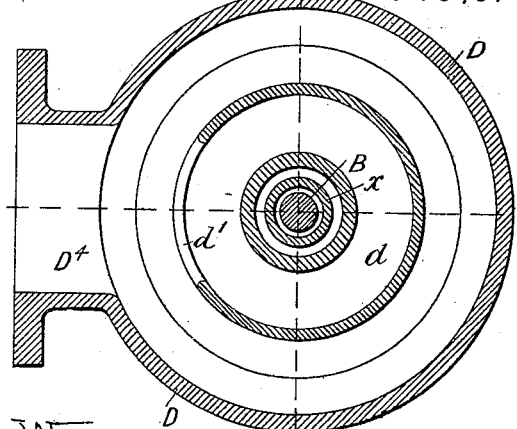

In the arrangements shown in Figs. 5 and 6 the cover A of chest D is formed with a hollow or annular chamber-space $d$, and an opening $d'$ is formed at the upper part of this chamber. This annular chamber may or may not be fitted in our valves, and the openings in same may lead directly to outlet branch of valve, as shown in Fig. 5, or may be placed opposite to the outlet branch, as shown in Fig. 12, or the openings may be divided into any number, as shown in Fig. 9. The disk valve $b'$ is mounted loose. An outer spindle or sleeve $x$ is formed separate from the central spindle B and works through a screw-wheel $x'$ for independently operating the piston-valve E. The wheel $x'$ is used for operating this spindle $x$, and when the latter is moved downward the projecting part $x^2$ on it acts on inner central boss part of piston E to move it down to its lowest position, while by raising the spindle $x$ the nut part $x^4$ on lower part of spindle presses on under central boss-surface of valve E and raises same. A pointer $x^5$ would be secured to the spindle $x$ to indicate the open, shut, and automatic positions of the piston E. A baffle-plate P is fitted under the piston, so that in the event of priming the water will be projected against the plate P and directed through the openings $E'$ in piston E. When the valve $b$ is raised from off its seat $D^2$, steam or other fluid passes in by the branch $D^2$ and passes through the segmental ports $E'$ of valve E and raises the disk $b'$ against the stop $d^2$ on end of stuffing-box. The steam passes into chamber $d$ and through the opening $d'$, filling the outer chamber above the piston E, and passes to the outlet branch $D^4$. Should the pipe burst or an escape take place, the pressure throughout the system is released, and by this release of pressure the automatic piston-valve E will be instantly and automatically raised until it comes against the disk $b'$ in the raised position of the latter, and the supply will be shut off. With this type of valve, Figs. 5 and 6, when used in connection with a battery of boilers the valve $b'$ would act as the non-return valve, so that should the pressure in any one boiler be reduced the steam from the boilers with full pressure in passing to that with the reduced pressure would act on the back of the disk valve $b'$ and shut it on its seat, covering the segmental openings $E'$ in piston E, and so isolate the boiler referred to.

Figure 7:
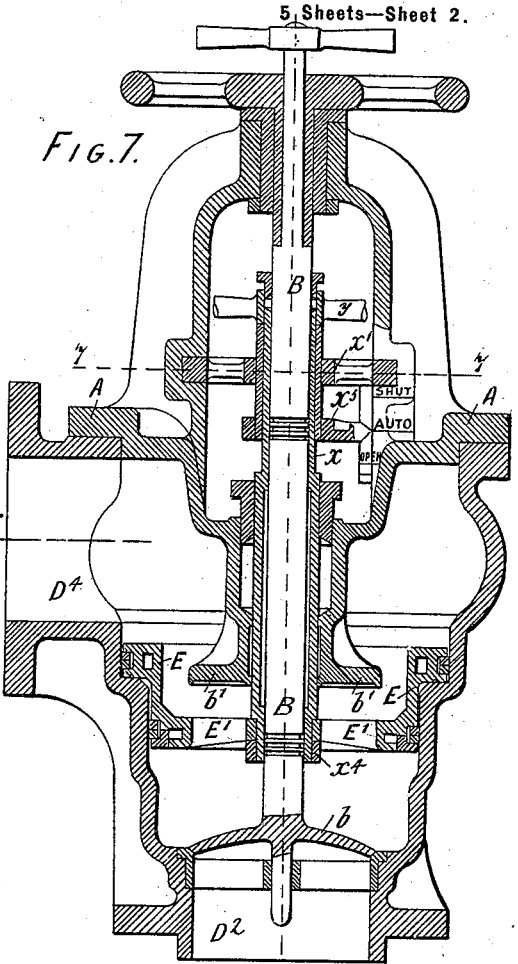
Figure 8:
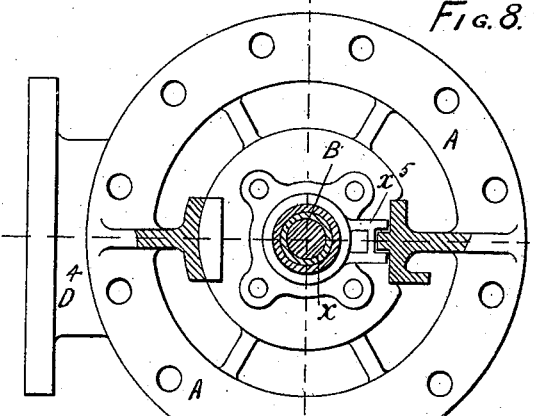

The arrangements shown in Figs. 7 and 8 are substantially the same as those shown in Figs. 5 and 6 except that the annular chamber is omitted and the stop-valve $b$ is arranged to act as the non-return valve, the valve $b'$ being formed on end of stuffing-box. A screw-wheel is used for operating the spindle $x$, and a handle or lever $y$ is used for testing the automatic-acting piston-valve E.

In the arrangements shown in Figs. 9 to 18 the stop-valve $b$ is dispensed with, and our improved valves may be worked independently or in conjunction with ordinary stop-valves. These views, Figs. 9 to 18, show some types of these valves, and they are preferably used when fitting automatic valves to existing pipes in such a manner as is shown in Fig. 9.

In the arrangement Figs. 9 to 11 the inlet branch $D^2$ of our improved valve is shown coupled to the outlet branch of an ordinary stop-valve, the outlet end of chest being connected to the pipe, the spindle B and the automatic piston-valve E being operated by a hand-lever F. The action of this valve is similar to those hereinbefore described. The stop-valve is opened, and the steam or fluid passes by the outlet branch of stop-valve to inlet branch $D^2$ and passes through the segmental openings $E'$ of valve E, lifting the disk valve $b'$ against the stop $d^2$ and passing by the openings $d'$ in annular chamber to pipe. Should the pipe burst or an escape take place, the pressure in pipe is released and the automatic-acting piston-valve E is moved against the disk valve $b'$ in the raised position of the latter and the supply instantly and automatically shut off. The disk valve $b'$ might be dispensed with and the piston E arranged to shut the openings $d'$ when a burst or escape had taken place.

In the arrangements shown in Figs. 12 to 14 the spindle B is shown as connected at $F'$ to an actuating hand-lever F, fulcrated at $F^2$, while the position in which the piston E may be at any time is indicated by a pointer $x^5$ on a dial X, this being effected by a stud $h$ on piston E being connected by a crank $h'$ to a slotted lever $h^2$, mounted on a spindle $h^3$, on which the pointer $x^5$ is secured. The opening in annular chamber in this case being placed opposite to the outlet branch $D^4$, the steam would pass through the segmental ports $E'$ of valve E, raising the disk $b'$ against the stop $d^2$ on end of stuffing-box. The steam or fluid then passes into the chamber and travels by the opening $d'$ into the outlet branch $D^4$, passing around above the top of valve E. Should the pipe burst or an escape take place, the pressure is released, and the piston-valve E rises against the disk valve $b'$ in the raised position of the latter and the supply is shut off.

In the arrangements shown in Figs. 15 and 16 the disk valve $b'$ is shown as formed on the spindle B, the other parts and working of the arrangements shown on this sheet being similar to those hereinbefore described.

In the arrangements shown in Figs. 17 and 18 the valve $b'$ is shown formed on a tubular spindle $x$, operated by a lever F, the position of the disk valve $b'$ also being indicated by the lever F. The piston E is operated by a hand-wheel, being brought to its lowest position by a projection $x^2$ on the central spindle B and being raised by the nut $x^4$ on same spindle in the upward travel of the latter. In the same manner and using the lower disk valve three separate spindles may be used, one for operating the upper disk valve, the other for operating the piston-valve, and the third for operating the lower disk or stop valve.

In applying our improvements to a water-gage, as shown in Figs. 19 and 20, the water-indicating glass gage Z would be secured by screwed-on caps Z' Z² between stuffing-boxes D³ on the steam and water inlet chests D, respectively. The valve-fittings within each of the chests D would, according to our improvements, be constructed all as follows: A cover A would be fixed on the chest D from the opposite end to that of the steam and water inlet branch D⁴ or G, respectively. This cover A would be fitted on the outside with a stuffing-box A' for spindle B and on the inside with two cylindrical seats C' C², one with the other forming an annular hollow chamber C between them, with the outer seat $c^2$ fitting the inner surface of chest D and the inner seat C' mounted on the end, with an annular hollow collar-valve E moving loose between these seats C' and C². The spindle B, passing through the stuffing-box A' on outside of cover A, would be formed with a screw-thread B' on its inner center part to work within a hollow screw part on the cover A and the inner end mounted with a disk valve $b$, fixed on end of spindle B outside the annular collar-valve E, while another disk valve $b'$ would be formed on end of seat C' within the hollow collar-valve E.

In the normal working position the pressure fluid or steam would pass from the inlet branch G or D⁴ between the outer disk valve $b$ and through openings E' of hollow collar-valve E, through the stops $b^2$ and an opening C³ into the annular hollow chamber C between the cylindrical seats C' C², from whence it would pass into the indicating glass gage Z. Should the glass gage Z get broken or burst, however, the annular collar-valve E will be automatically moved from the flanged stop D' on chest D until it travels in and abuts against the inner disk $b'$ and there form a fluid or steam tight joint.

The disk valves $b$ are made to close the fluid-ducts D⁴ and G, which act as seats, and the valves $b'$ to close the end openings in the hollow collar-valves E when a burst takes place. Ribs $b^2$ are formed on the valves $b'$ to permit of the passage of the steam or water in the normal working conditions. In this arrangement to make sure of being perfectly steam-tight, however, when replacing the broken glass the spindle B may be turned to move and secure the outlet-valves $b$ against the inlet branch D⁴ or G. This is the position when the valves are closed. For operating the valves $b$ the spindles B of the steam and water chests D are fitted with hand-wheels I and H and pins I' and H' fitted in the backs of the wheels. When turning these hand-wheels to open or close the valves, these pins are arranged to run into or out of connection with a rod J, connected by a pin H² to the handle K³ of a blow-off sludge-cock K', fitted in a casing K below the water-inlet chest D. When blowing through the cock and both the top or steam valve and the bottom or water valve, the handle K³ is pulled down, turning the hand-wheels H I, thereby bringing the shoulder B˟ on the spindle B (inside of the disk valve $b'$ and annular collar-valve E) out, and thus keeping the annular collar-valve E from closing on the inner disk valve $b'$.

When blowing through the cock and top or steam valve only or the cock and bottom or water valve only, the hand-wheel H or I, respectively, is turned and the valves opened or closed independently, the positions and sizes of the various valves being adjusted to permit of these movements.

The various details and parts of the valves herein shown and described may be modified, interchanged, and arranged to suit the requirements of any service, and we do not limit ourselves to these arrangements shown, but reserve the right to use in conjunction with our system of valves any of the ordinary methods now in use for operating valves.

We claim as our invention—

1. The herein-described means for automatically shutting off steam, gas or other fluid-pressure, consisting in the combination with a valve-chest having inlet and outlet for the fluid, of a movable annular piston valve or diaphragm having differential areas exposed to the fluid-pressure with the greater area away from the direction of flow of said fluid-pressure, whereby the valve is kept normally open, and an abutment against which the valve seats to close the inlet upon a sudden reduction of pressure on the outlet side.

2. The combination with the valve-casing having inlet and outlet, of a movable piston-valve having differential areas exposed to fluid-pressure with the greater area away from the direction of flow of the fluid-pressure and passages for the flow of fluid around or through said valve, and an abutment against which the valve is seated to close the passages when a burst takes place.

3. The combination with a valve-casing having inlet and outlet, of a movable annular piston-valve having differential areas exposed to the fluid-pressure and through and around which the fluid flows from inlet to outlet, a spindle passing loosely through the valve and an abutment on said spindle, against which the valve is seated by fluid-pressure when a burst takes place.

4. The combination with a casing having inlet and outlet for fluid-pressure, of a movable annular piston-valve having differential areas exposed to the fluid-pressure, a baffle-plate between the said valves and the inlet, and an abutment against which the valve is seated to shut off the passage of fluid when the pressure on the outlet side is suddenly reduced.

5. The combination with a valve-casing having inlet and outlet, of a movable annular piston-valve having differential areas exposed to the fluid-pressure, and around or through which valve the fluid passes to the outlet, and an abutment against which the valve is seated by the fluid-pressure when reduced on the outlet side, and a spindle adapted to be connected to said valve for testing purposes.

6. The combination with a valve-casing having inlet and outlet, of a movable annular piston-valve having differential areas exposed to the fluid-pressure and openings therein through which the fluid passes from inlet to outlet, a spindle passing through said valve, and a disk mounted on said spindle against which disk the valve is seated when the pressure on the outlet side is suddenly reduced.

7. The combination with the valve-casing, having inlet and outlet, of a spindle provided with a valve for controlling the inlet, a movable annular piston-valve between the inlet-valve and the outlet and having differential areas exposed to said pressure and normally open to permit the passage of the fluid, and an abutment against which the said annular valve is seated by fluid-pressure when a burst takes place.

In testimony whereof we have signed our names to this specification in the presence of two subscribing witnesses.

ALEXANDER THOMSON MACFARLANE.
GEORGE WALLACE BRYANT.

Witnesses:
DAVID SMITH,
GEORGE MACFARLANE.